United States Patent [19]

Preston

[11] 4,175,350
[45] Nov. 27, 1979

[54] ANIMAL TRAP WITH SENSITIVE TRIGGERING DEVICE

[76] Inventor: Joseph L. Preston, 219 Orlemann Ave., Oreland, Pa. 19075

[21] Appl. No.: 892,211

[22] Filed: Mar. 31, 1978

[51] Int. Cl.² ............................................ A01M 23/24
[52] U.S. Cl. ............................................ 43/82; 43/93
[58] Field of Search .................... 43/61, 81, 82, 93, 94

[56] References Cited

U.S. PATENT DOCUMENTS

| 691,301 | 1/1902 | Tschantre | 43/61 |
| 1,061,304 | 5/1913 | May | 43/82 |
| 1,160,623 | 11/1915 | Ledyard | 43/94 |
| 1,207,991 | 12/1916 | Owen | 43/81 |
| 1,422,049 | 7/1922 | Gould | 43/82 |
| 2,278,117 | 3/1942 | Perinelli | 43/61 |
| 2,803,918 | 8/1957 | Hall | 43/61 |

FOREIGN PATENT DOCUMENTS 468516  7/1914  France ........................................ 43/61

*Primary Examiner*—Nicholas P. Godici
*Assistant Examiner*—Robert P. Olszewski
*Attorney, Agent, or Firm*—John Shaw Stevenson

[57] ABSTRACT

An animal trapping apparatus has a pair of box-shaped jaws that are held in a closed position by a biasing means at one of their ends and which are retained in an open trigger set position, against the force of the biasing means, by an actuator rod that extends between the other ends of the jaws. A sensitive triggering device for this trap is achieved by positioning the lower bait carrying end of the rod for pivotal rotary movement on the inner base surface of one of the jaws and by providing a bent catch portion on its upper end that is readily disengageable from the other jaw whenever a slight contact is made with its bait retaining end and simultaneous turning of the rod on the inner base surface occurs.

10 Claims, 3 Drawing Figures

ANIMAL TRAP WITH SENSITIVE TRIGGERING DEVICE

SUMMARY OF THE INVENTION

It is an object of the present invention to provide an improved animal trapping apparatus having a pair of box-shaped jaws that are spring biased to a closed position and an extremely sensitive device in the form of a rod having a bait retainer in pivotal engagement with one jaw and an opposite end portion in line contact with a portion of a wall forming a passageway in the other jaw so that the jaws can be rapidly closed when very slight contact with the bait retainer occurs.

In accomplishing these and other objects there has been produced in accordance with the present invention an improved animal trapping apparatus that has a substantially vertically positioned rod to keep a pair of box-shaped jaws open against a jaw closing force being applied by a biasing means. A bait retaining end of the rod is pivotally movable in a rotary manner on one jaw and an angularly bent catch portion of the rod is engaged in line contact with a portion of a wall forming a passageway in the other jaw. Slight contact with the bait supporting end of the rod causes a slight pivotal rotation of the rod on one jaw to occur sufficient to disengage the bent catch portion of the rod from the other jaw and this action causes the jaws of the trap to close.

BRIEF DESCRIPTION OF THE DRAWINGS

A better understanding of the present invention may be had from the following detailed description when read in connection with the accompanying drawing in which.

DESCRIPTION OF A PREFERRED EMBODIMENT

Figures 1, 2, 3:
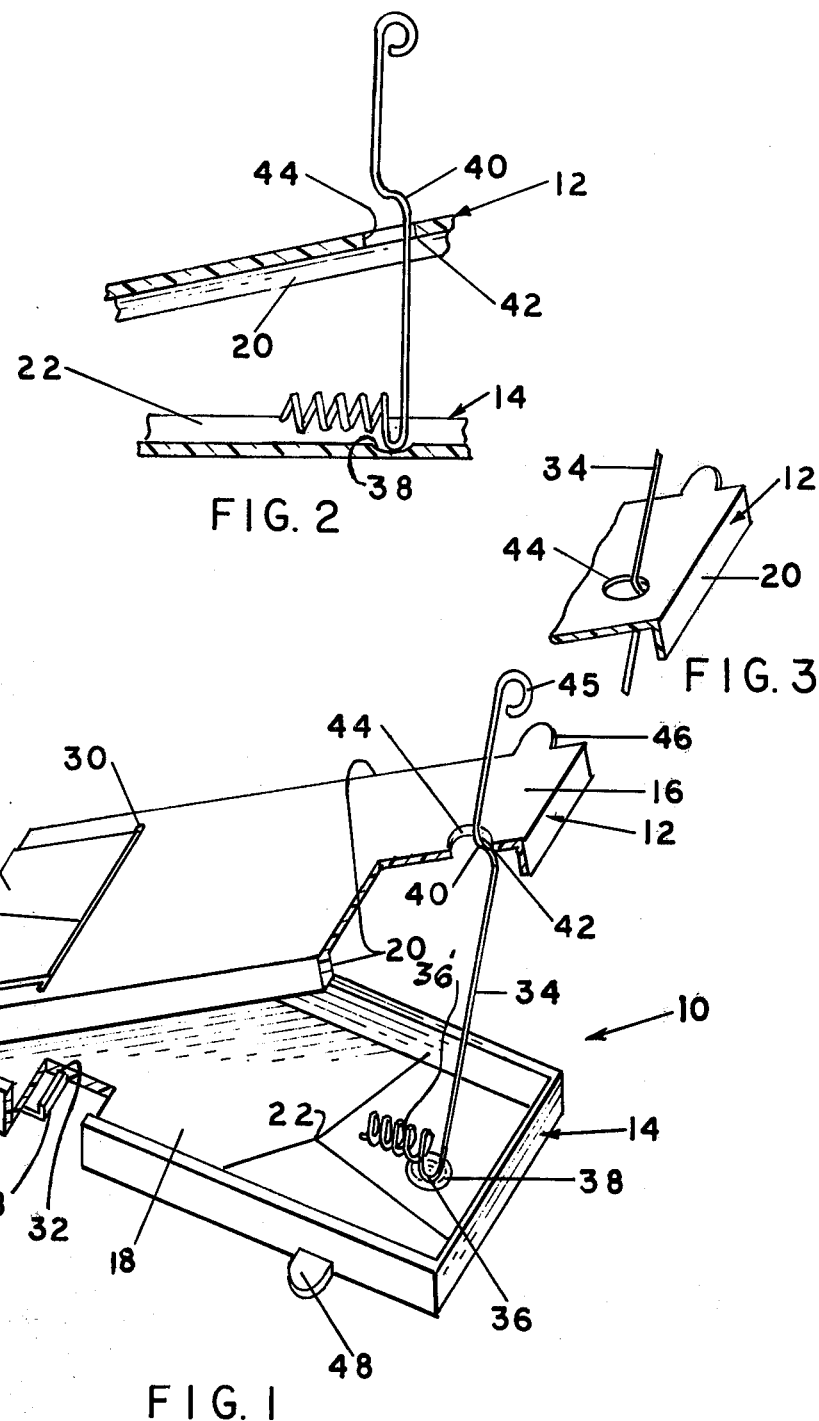
FIG. 1 is a view partially in section showing my trapping apparatus in an open, trigger set position.
FIG. 2 is a view showing the trapping apparatus as its upper jaw is being moved to a closed position and FIG. 3 shows a view partially in section of the right end of the upper jaw of the trap with the jaw triggering rod extending therethrough when it is in a trigger set position as shown in FIG. 1.

Refering now to FIG. 1 there is shown an animal trapping apparatus 10 consisting of two identical box-shaped jaw members 12, 14 preferably constructed of molded plastic material which has shock resistant characteristic such as any commercially available fiber glass filled plastic material; e.g. RYTON-8. The jaw members 12, 14 have associated base portions 16, 18 and side walls 20, 22. A U-shaped biasing means 24 in the form of a U-shaped compression spring contains two flanged portions 26, 28, one at each end, inserted into slots 30,32 in their associated jaw members 12, 14. The other end of the jaws contain a trigger means in the form of an actuator rod 34 which is preferably made of the same material from which a commonly used metal paper clip is constructed. The lower end of the rod 34 has a U-shaped portion 36 in contact with a concave surface 38 in the base 18 of jaw member 24. The rod 34 is also shown as having a spiral bait retainer 36'. A bent part 40 of the rod 34 extends at an obtuse angle away from its vertical longitudinal axis into contact with a lower edge 42 of a wall forming passageway 44 in the jaw 12. The rod 34 also has a crook shaped finger grasping portion 45 at its upper end.

Each jaw 12, 14 has a pair of lug members on its opposite sides similar to the lug member 46 on jaw 12 and lug member 48 on jaw 14. The pair of lug members on jaw 12 are displaced longitudinally from the pair of lug members on jaw 14.

MODE OF OPERATION

Before setting the trap 10 a pair of lugs 46, 48 on each of the opposite sides of the box-shaped jaws 12, 14 are grasped and opened by the operator's fingers against the closing force of the U-shaped compression spring 24. The actuator rod 34 which is stored between the two normally closed jaws 12, 14 can then be dropped out between these jaws 12, 14. Bait, not shown, is then inserted into the center of the bait retainer 36'. With the jaws in an open position the crook end 45 of the rod is then inserted through the passageway 44. With the lowermost jaw 14 pressed firmly against any stationary flat surface by the lower end 36 of the rod 34, a pair of lugs 46 located on the opposite side of the jaw 12 can then be grasped by the operator's fingers and the jaw 12 can then be pulled in an upward direction away from jaw 14 through FIG. 2. position until the bent angularly displaced portion of the rod can be brought into the open trigger set position with an edge portion of the wall forming passageway 44 as shown in FIG. 1.

When the trapping apparatus 10 is placed in the open position as shown in FIG. 1 and any part of the bait retaining portion 36' of the rod 34 is touched slightly, the U-shaped part 36 of the rod will pivot about the concave portion 38 in the base 18 of jaw 14. As the rod 34 is pivoted in this manner and passes through an acute angle, not exceeding a fifteen degree arc, this action will cause the bent catch part 40 of the rod shown in FIG. 1 to rotate out of supporting contact with a lower edge portion 42 of the passageway 44 into a released position as shown in FIG. 2. Releasing the rod 34 in this manner allows the stored force of compression spring 24 to be applied to the upper jaw 12 and this causes rapid movement of the inverted upper jaw 12 in a downward direction against the top surface of the sides 22 of the bottom jaw 14 thereby placing the jaws in a trapping position.

When the jaw 12 closes against the jaw 14, the crook end 45 can be grasped by the operator's fingers so that the entire trap 10 can be carried to a trash can for disposal or can be rebaited and reset to an open latched position each time it is desired to perform an additional trapping operation.

The embodiments of the invention in which an exclusive property or privilege is claimed are defined as follows:

1. An animal trapping apparatus, comprising:
   a pair of box-shaped jaw members each having vertical walls that have contacting surfaces that are in physical contact with one another,
   a means connected to, and surrounding a pair of adjacent end portions of said jaws tending to bias said walls of said jaws into said surface to surface contacting position,
   said other opposite end portions of said jaws having a trigger in the form of a rod whose entire length is of a cylindrical cross shape configuration, said trigger rod being positioned to extend between said last mentioned jaw portions to retain the jaw in an open position against the force of said biasing means, one end portion of said rod being mounted on an inner dished out base portion of one of said box-shaped jaw members for pivotal clockwise and counter clockwise rotary movement about a vertical axis, another oppposite end portion of said cylindrical rod having a bent portion which forms a catch of said trigger, a wall forming a cylindrical passageway in the other one of said box-shaped jaw members that is of a size sufficient to allow the free passage of the rod therethrough and said bent catch portion of the cylindrical rod being bent to an angle sufficient to engage an edge portion of the wall of said passageway and thereby provide a sensitive triggering means for holding said jaw members in an open trigger set position.

2. The apparatus as defined in claim 1 wherein said bent portion extends at an obtuse angle away from the longitudinal axis of the portion of the rod that extends away from its pivotal end.

3. The apparatus as defined in claim 1 wherein the catch end of said rod has an elongated finger-engaging crook portion extending therefrom for pivotally positioning an opposite end of the rod on the inner dished out surface of the base of one of the jaw members and to enable said bent catch portion to be engaged with the edge of a wall forming the passageway in the other jaw member when said jaw members are placed in said trigger set position.

4. The apparatus as defined in claim 1 wherein the pivotal end of said rod is of a U-shaped configuration and has a coil shaped end portion extending therefrom which forms a bait retainer.

5. The apparatus as defined in claim 1 wherein the pivotal end of said rod is of a U-shaped configuration and has a coil shaped end portion extending therefrom which forms a bait retainer and wherein part of the bait retainer is positioned below and the remaining part above the top of the walls of the jaw member on which said rod is pivoted.

6. The apparatus as defined in claim 1 wherein said portion of said box-shaped jaw against which said rod is connected for pivotal movement is of a concave configuration.

7. The apparatus as defined in claim 1 wherein the bent catch portion of the rod is connected for unlatching movement away from its engaged trigger set position with said edge of the wall forming said passageway to a position in said passageway that is out of contact with said wall when said rod is rotated through an arc not exceeding fifteen degrees.

8. The apparatus as defined in claim 1 wherein the bent catch portion of the rod is connected for unlatching movement away from its engaged trigger set position with said edge of the wall forming said passageway to a position in said passageway that is out of contact with said wall when said rod is rotated through an arc not exceeding fifteen degrees and wherein the jaw member that contains said passageway is thereafter free for movement by said biasing means toward and into engagement with the other jaw member.

9. The apparatus as defined in claim 1 wherein a portion of said rod adjacent to its pivoted end has a bait retainer extending therefrom.

10. The apparatus as defined in claim 1 wherein a portion of said rod adjacent to its pivoted end has a bait retainer extending therefrom and wherein said bait retainer is juxtapositioned with respect to said pivoted portion of said rod to cause simultaneous rotation of said rod about its pivot end and the resulting simultaneous unlatching of its angular shaped catch end from said wall of said passageway whenever a slight force in either of said rotary clockwise or counter clockwise directions is applied to the bait retainer part of the rod.

* * * * *